United States Patent Office 3,522,360
Patented July 28, 1970

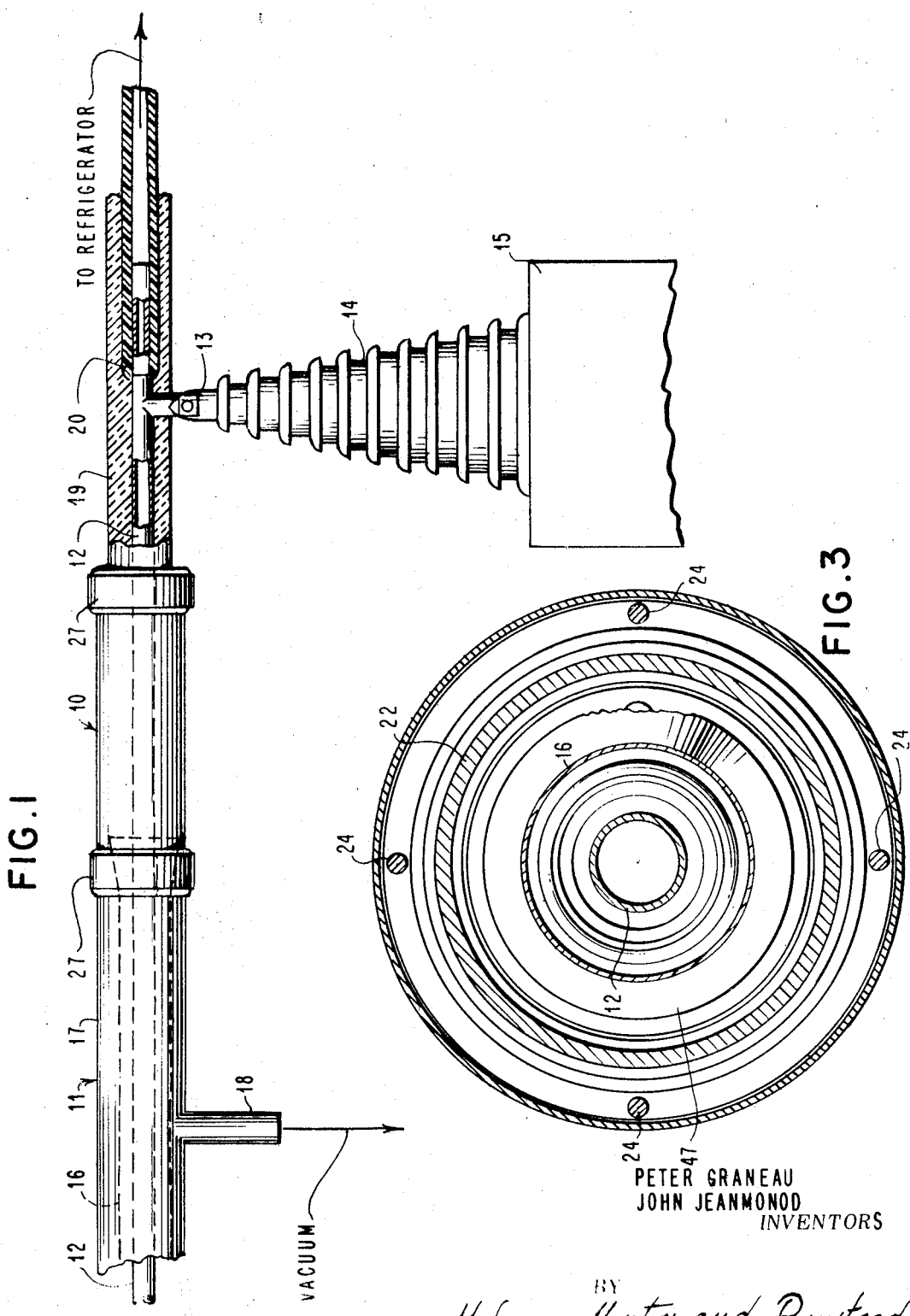

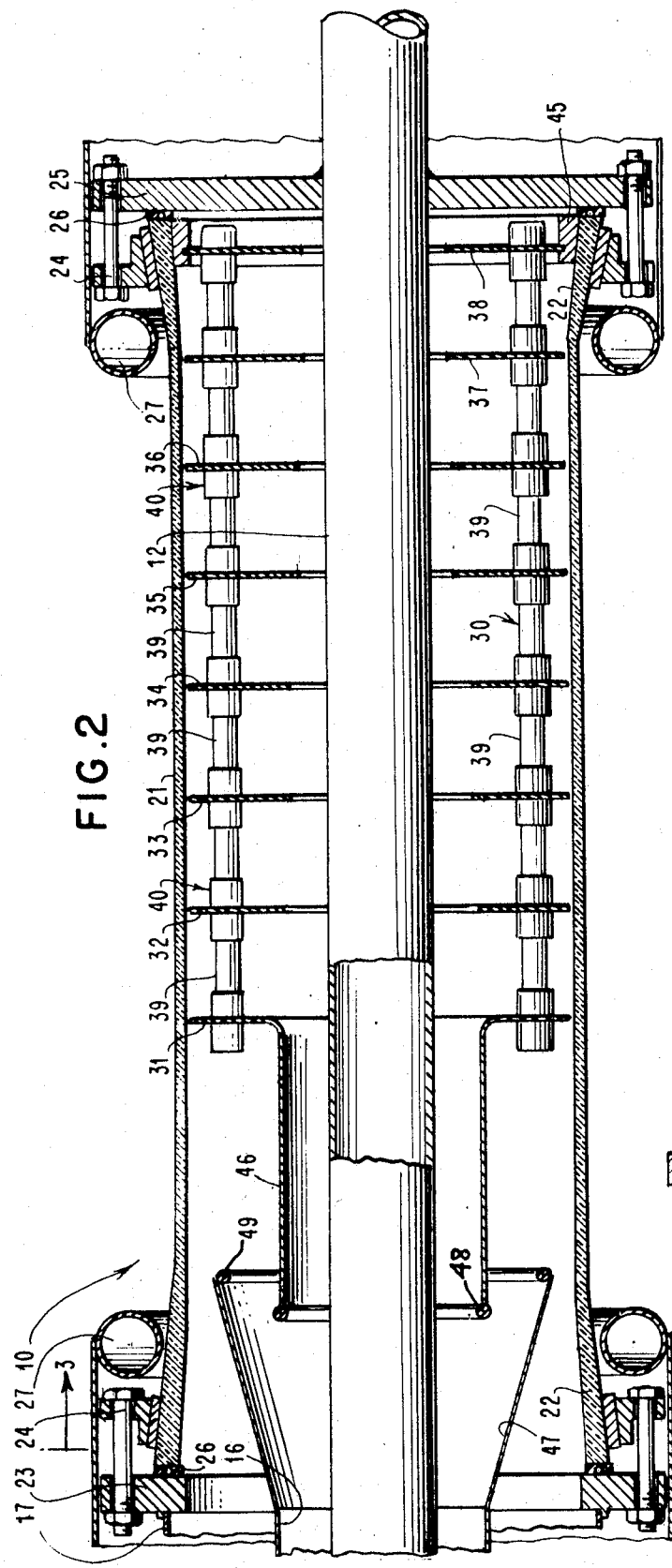

3,522,360
TERMINATION OF VACUUM-INSULATED HIGH-VOLTAGE CONDUCTOR
Peter Graneau, Concord, and John Jeanmonod, Hyde Park, Mass., assignors to Simplex Wire and Cable Company, Cambridge, Mass., a corporation of Massachusetts
Filed May 6, 1969, Ser. No. 822,197
Int. Cl. H02g 15/02; H01b 17/36
U.S. Cl. 174—9                                    3 Claims

ABSTRACT OF THE DISCLOSURE

A conductor suitable for carrying electrical power at high voltage which is insulated by supporting it in an evacuated housing is terminated externally of the housing by extending the conductor out of the housing through a dielectric sleeve attached to the housing to provide spacing which is sufficient to prevent flash-over between the end of the conductor, where it extends out of the sleeve, and the housing. Internally the sleeve is evacuated and an ion shield is positioned in the space within the sleeve about the conductor in order to inhibit electric discharge in such space which is relatively long, evacuated and under high electric stress.

---

This invention relates to termination of electric conductors subjected to high electric stress and, in particular, provides a termination for a high-voltage, vacuum-insulated conductor.

Recently there has been interest in the transmission and distribution of electric power utilizing conductors insulated by vacuum. One or more conductors are positioned enclosed within an outer housing, such as an elongated, evacuated vessel, in which they are spaced apart and from the housing, frequently utilizing ground shields for the conductors, in order to prevent electric discharge between the conductors or between a conductor to a shield or to the housing. At the triple point junction of vacuum, dielectric and conductor in a location of high electrical stress electrons tend to escape at or to bombard the junction. As some gas molecules are inevitably present in the evacuated space, electron movement in the evacuated space can cause ionization of the gas molecules present, and acceleration of the ions so formed can lead to ion-multiplication and to collisions producing X-rays, ultimately generating conditions suitable for electrical discharge in the evacuated space. Consequently, the spacing of conductive elements in an evacuated space in which electrical stress can exist is held to a minimum to minimize the velocity which can be attained by any escaping electrons and any ions which might thereby be formed.

In carrying a vacuum-insulated conductor out of its evacuated housing to form a termination of the conductor, in order to prevent flash-over the conductor must be spaced in air a greater distance from the housing than is desirable or even feasible in the vacuum. In accordance with this invention, such a termination is provided by utilizing a rigid dielectric sleeve to form an extension on the exterior of the housing of a vacuum-insulated conductor about a port on the housing through which port and sleeve the conductor can be brought to a termination spaced adequately from the housing.

In such a construction, an annular evacuated space of substantial length exists within the sleeve about the conductor which is under high electric stress providing those undesirable conditions described above which lead to electrical breakdown through acceleration of charged particles in the annular space. Thus, in accordance with this invention, an ion shield is provided in such annular space, to limit the path of any charged particle accelerating under electric stress in the annular, evacuated space. In accordance with this invention, such an ion shield is in the form of a plurality of conductive, annular disks which are positioned in the annular space about the portion of the conductor which extends through the sleeve. The disks are spaced from one another lengthwise in the annular space with the perimeter of each disk closely adjacent the inside of the sleeve and with the inner edge of the disk spaced from the surface of the conductor.

The disks forming the ion shield should be insulated from one another, the conductor and the housing; except the end disks remote from the housing can be connected to the conductor, the end disks adjacent the housing can be connected to the housing or a conductor shield and adjacent disks can be connected to each other. At least three disks or groups of electrically connected adjacent disks should be provided electrically insulated from each other.

The electrically insulated disks or groups of adjacent disks are distributed in an electric field and tend to assume potentials between (1) ground at the disks adjacent the housing and (2) the potential on the conductor at the disks more remote from the housing. Thus the disks adjacent the housing must be spaced from the conductor a relatively greater distance than the disks which are more remote from the conductor need to be spaced. More effective shielding can then be obtained by limiting the spacing between the disks and the conductor at the minimum required safely to prevent breakdown under the stress present between each disk and conductor. As a result in the preferred arrangement the spacing between the disks and conductor progressively decreases from the disks adjacent the housing to those more remote from the housing.

In positioning any structure in a vacuum subjected to high electrical stress, it is desirable to minimize the occurrence of occluded volatiles. In accordance with this invention, the ion shield is preferably supported in the dielectric sleeve about the conductor utilizing posts attached between adjacent disks of the ion shield structure by mechanical devices, such as threaded joints, and avoiding complicated glass-to-metal bonds and avoiding adhesives or the employment of other organic materials in which volatiles might be present. Preferably the posts utilized as supports and as spacers for the disks are either formed of metal or machinable, non-organic dielectric materials, such as Mycalex, a material composed of finely powdered mica and glass bonded under conditions of high temperature. It will be apparent that dielectric posts are employed where it is desirable to support adjacent annular disks electrically insulated from each other, while metal posts can be employed where electrical connection between adjacent disks is desired.

For a more complete and practical understanding of this invention, reference is made to the appended drawings in which:

FIG. 1 is an elevation shown partly in section of an end of a high-voltage, vacuum-insulated conductor having a termination in accordance with the invention to permit connection with a source of high voltage;

FIG. 2 is a longitudinal section through the termination shown in FIG. 1;

FIG. 3 is a cross-section taken at line 3—3 in FIG. 2; and

FIG. 4 is an enlarged fragmentary section of a joint shown in FIG. 2.

Referring more particularly to FIG. 1, the reference numeral 10 designates a termination in accordance with this invention for a high-voltage, vacuum-insulated cable 11 to permit connection of the conductor 12 in such cable with an aerial lug 13 projecting from a porcelain insulator 14 on a high-voltage transformer 15 to which lug 13 is electrically connected through insulator 14. Cable 11 includes conductor 12, a ground shield 16 (see FIG. 2) coaxially positioned about and spaced from conductor 12 by means of supporting devices such as shown in Graneau application Ser. No. 727,993, filed May 9, 1968. Shield 16 in turn is supported mechancially in a tubular housing 17 which is ported at 18 to permit connection to evacuation apparatus to enable the interior of housing 17 to be evacuated thereby evacuating the annular space between conductor 12 and shield 16.

Conductor 12, as seen in FIG. 2, extends through termination 10 and, as seen in FIG. 1, on exiting termination 10 is connected to aerial lug 13. In the particular cable 11 illustrated, conductor 12 is designed to be cooled to remove Joule losses by circulation of liquid refrigerant through the hollow center of conductor 12. Typically a refrigerant, such as liquid nitrogren maintained under a pressure of 20 atmospheres, is employed. Consequently, the portion of conductor 12 extending out of termination 10 is provided with thermal insulation 19 and is connected to a solid dielectric tube 20, as well as to aerial lug 13, to permit connection of the interior of conductor 12 under electrically isolated conditions to the intake or discharge side of a refrigerator for the liquid refrigerant circulated through conductor 12.

Referring more particularly to FIG. 2, termination 10 includes an elongated glass sleeve 21. The ends of sleeve 21 are thickened and widened slightly as indicated at 22 to permit attachment of one end of sleeve 21 to an annular flange 23 mounted on and forming a port at the end of housing 17 by means of wedge-action fasteners 24 and to permit the attachment of a closure plate 25 to the other end of sleeve 21 by means of similar wedge action fasteners 24. In each case a resilient gasket 26 is compressed between the one end of sleeve 21 and flange 23 and between the other end of sleeve 21 and plate 25 to insure a vacuum-tight closure between such parts. Closure plate 25 is centrally apertured to receive the end of conductor 12 which extends coaxially out of housing 17 and into and through termination device 10. Plate 25 is sealed about conductor 12 where the latter emerges through plate 25 by welding or the like.

Corona shields 27 are mounted over wedge action fittings 24 at each end of sleeve 21 in order to minimize the possibility of flash-over between closure plate 25 and annular flange 23 by providing smooth, round, conductive, exposed surfaces in electrical contact with each of such parts and fittings 24 associated with them.

An ion shield indicated generally by the reference numeral 30 is positioned in sleeve 21 about conductor 12 between closure plate 25 and annular flange 23. In the illustrated case, ion shield 30 includes a series of annular disks 31–38, inclusive, which are positioned in sequenc between flange 23 and closure plate 25 spaced from each other by posts 39 which are secured to disks 31–38 by threaded joints 40 (see FIG. 4 which illustrates a joint 40 at plate 32). Posts 39 are constructed of Mycalex rods which have been machined to provide a threaded stud 41 at each end of post 39. Each joint 40 is constructed by forming an aperture 42 in the disk 31–38 with which it is associated and by providing metal end caps 43 received on each associated stud 41 which in turn threadedly receive a short bolt 44 passing through aperture 42. Thus a mechanically clean and tight fit can be provided at joints 40 to secure each post 39 to its associated plates 31–38.

As will be observed in FIG. 2, each of disks 31–38, inclusive, has the same outside diameter which is sized to fit with limited clearance into sleeve 21. Disk 38, which is most remote from annular flange 23 and the ported end of housing 17, is received in an annular retainer 45, such that the assembly forming ion shield 30 can be slipped into the end of sleeve 21 remote from housing 17 before attachment of closure plate 25 with disk 31 entering first up to a position into which retainer 45 is wedged into such end of sleeve 21. The subsequent attachment of closure plate 25 then prevents further movement of ion shield 30.

It will be observed in FIG. 2 also that the inner edges of disks 31–38 are spaced from the surface of conductor 12 at distances which are progressively less from disk 31 to disk 38, although it will be apparent that certain adjacent pairs of disk have identical spacing as, for example, disks 33 and 34. It will be further observed that disk 31 differs from the remaining disks in that from its inner edge it has an extension in the form of a tube 46 having a diameter approximating that of ground shield 16. Tube 46 extends coaxially about conductor 12 toward housing 17 to a position closely adjacent the end of ground shield 16 which is flared into a cone 47, such that an overlap between the end of ground shield 16 and tube 46 is provided. The end of tube 46 and the end of cone 47 are provided with beads 48 and 49, respectively, to form rounded end surfaces minimizing corona discharge.

In operation with the annular space in shield 21 evacuated and under operating potentials the construction described above has been found to provide an effective termination despite the fact that the distance from ground shield 16 and annular flange 23 to closure plate 25 is substantially greater than can be tolerated with the applied stress under the conditions of vacuum utilized in the absence of ion shield 30. It is believed that the various disks 31–38, inclusive, tend to assume floating potentials when electrical stress is present to provide a gradient distribution of electrical stress between plate 25 and flange 23, such that electrons and other charged particles are trapped between adjacent pairs of disks between which only a limited electrical stress exists, and therefore the particles are not accelerated to a point leading to the conditions required for electrical discharge within sleeve 21.

The employment of tube 46 and cone 47 have been further found desirable to avoid breakdown between the ground shield and annular disk most closely adjacent to it. This construction may not be required in terminating a three-conductor cable utilizing a lateral extension of each conductor through its housing rather than a longitudinal extension of the conductor, as in the illustrated case utilizing a single conductor cable.

We claim:
1. A termination for a high-voltage, vacuum-insulated conductor contained within an evacuated housing having a port through which said conductor extends, said termination including:
 (A) a rigid dielectric sleeve positioned adjacent said port, about and spaced from said portion of said conductor,
  (i) one end of said sleeve being in sealing contact with said port and
  (ii) means closing the other end of said sleeve about said portion of said conductor
 whereby said sleeve contains an annular space in communication with said evacuated housing through which space said portion of said conductor extends; and
 (B) ion shield shield means positioned in said space, including
  (i) a plurality of conductive annular disks positioned in said space about said portion of said conductor spaced from one another between the ends of said sleeve,
   (a) the perimeter of each of said disks being closely adjacent the inside of said sleeve and
   (b) the inner edge of each of said disks being spaced from the surface of said portion of said conductor, and
  (ii) support means attached to said disks holding them in said spaced position in electrically isolated groups of one or more adjacent disks.

2. A termination according to claim 1 in which the spacing of said inner edges of said disks progressively decreases from said disks adjacent said one end of said sleeve to said disks adjacent said other end of said sleeve.

3. A termination according to claim 1 in which said conductor is provided with a shield coaxially positioned about said conductor in said housing, said shield including a flared conical end, and in which the disk adjacent said one end of said sleeve includes a tubular portion extending from the inner edge of said disk into said conical end of said shield.

References Cited

UNITED STATES PATENTS

| 2,251,534 | 8/1941 | Usselman | 174—142 |
| 3,126,439 | 3/1964 | Denholm et al. | 174—31 |
| 3,234,322 | 2/1966 | Frowein | 174—31 X |

FOREIGN PATENTS 66,589   10/1913   Switzerland.

LARAMIE E. ASKIN, Primary Examiner

U.S. Cl. X.R.

174—31, 73